United States Patent Office 3,441,606
Patented Apr. 29, 1969

3,441,606
ACYLATED HYDRAZINE COMPOUNDS
Donald R. Moore, Washington Township, N.J., and Giuliana C. Tesoro, Dobbs Ferry, N.Y., assignors to J. P. Stevens & Co., Inc., New York, N.Y., a corporation of Delaware
No Drawing. Continuation-in-part of application Ser. No. 301,875, Aug. 3, 1963. This application Sept. 27, 1963, Ser. No. 312,002
Int. Cl. C07c *141/00, 121/60, 109/00*
U.S. Cl. 260—561          12 Claims

ABSTRACT OF THE DISCLOSURE

Reactive hydrazine compounds represented by the structural formula:

$$X-N(R)-N(R_1)-Y$$

wherein X is a member selected from the group consisting of $$R_2OCH_2CH(R_3)-CO-,\ CH_2=C(R_3)-CO-,\ QCH_2CH(R_3)-CO-,\ \text{and}\ DCH_2CH(R_3)-CO-$$

these compounds being suitable as chemical modifying agents for polymers containing active hydrogen atoms and particularly as crosslinking agents for textiles.

This application is a continuation-in-part of copending application Ser. No. 301,875 filed Aug. 3, 1963, and now abandoned.

The present invention relates to new and novel compounds and methods for preparing them and, more particularly, to new and novel reactive hydrazine compounds and novel methods for their preparation.

The novel compounds of the present invention are applicable for a wide variety of uses. For example, they can be employed as modifying agents for materials containing active hydroegn atoms and as crosslinking agents.

It is an object of the present invention to provide new and novel reactive hydrazine compounds.

It is another object of the present invention to provide hydrazine compounds which function as crosslinking agents.

It is a further object of the present invention to provide polymers of hydrazine compounds.

It is a further object of the present invention to provide methods of making the new and novel reactive hydrazine compounds.

In attaining the above objects, one feature of this invention resides in the presence of a reactive moiety in the hydrazine compound which is capable of reacting with various materials containing active hydrogen atoms.

Other objects and features of this invention will become apparent from the following detailed description thereof.

The new compounds including monomeric, monofunctional and polyfunctional compounds are derived from hydrazines and contain at least one group schematically represented by the structural formula:

$$X-N-N-$$

wherein X represents an organic reactive functional moiety which contains a carbonyl group of the formula:

$$-\overset{O}{\underset{\|}{C}}-$$

Included among the new and novel compounds of the present invention are those which are represented by the structural formula:

(I)     $$X-N(R)-N(R_1)-Y$$

wherein X is an organic reactive functional moiety and is a member selected from the group consisting of:

$$R_2OCH_2CH(R_3)-CO-,\ CH_2=C(R_3)-CO-,\ QCH_2CH(R_3)-CO-,\ \text{and}\ DCH_2CH(R_3)-CO-$$

wherein

R and $R_1$ are selected from the group consisting of hydrogen, substituted and unsubstituted alkyl, aralkyl and aryl groups, and $R_2$ is selected from the group consisting of hydrogen, lower alkyl and acyl, and $R_3$ is selected from the group consisting of hydrogen and lower alkyl, and Q is the conjugate base of a Lowry-Bronsted acid which has a dissociation constant in water between $5 \times 10^{-2}$ and $5 \times 10^{-5}$, and Y is a member selected from the group consisting of hydrogen, alkyl, substituted alkyl, acyl, substituted phenyl and X, and D is halogen.

Further compounds included within the scope of the present invention are monomers represented by the structural formula:

(II)     $$X-N\diagdown_A\diagup N-Y$$

wherein

X and Y have the meanings given above in Formula I, and
A is a member selected from the group consisting of alkylene and substituted alkylene groups of from 3 to 4 carbon atoms.

Additional compounds included in the present invention are monomeric compounds of the structural formula:

(III)     $$X-N(R)-N=C(R_3)Z$$

wherein

X, R and $R_3$ have the same meaning as above, and
Z is a member selected from the group consisting of substituted and unsubstituted alkyl, aryl and alkylaryl groups.

Compounds represented by the structural formula:

(IV)

$$X-N(R)-NH-CH(R_3)-Z$$

wherein X, R, $R_3$ and Z have the meaning as above, are obtained by reducing the hydrazone compounds of Formula III.

Examples of compounds which are included in generic Formula I are represented by the structural formula:

$$R_2OCH_2CH(R_3)CON(R)-N(R_1)-Y$$

wherein R and $R_1$ have the same meaning as above. Examples of R and $R_1$ include hydrogen, alkyl groups from 1 to 18 carbon atoms, cyano-loweralkyl, hydroxyloweralkyl, halo-loweralkyl, benzyl, phenyl nitrophenyl, halophenyl, and the like, $R_2$ has the same meaning as above and includes lower alkyl, i.e. 1–5 carbon atoms and $R_4CO$- where $R_4$ is an alkyl group containing from 1 to 5 carbon atoms or a phenyl radical,
$R_3$ has the same meaning as above,
Y has the same meaning as above and includes hydrogen, alkyl, cyanoalkyl, haloalkyl, benzoyl, substituted benz- Specific examples of compounds included within the scope of the present invention, particularly Formula I thereof, are shown in the following table which contains in addition an illustration of some of the applications for which the present compounds are suited.

TABLE I.—COMPOUNDS OF FORMULA I

| X | R | $R_1$ | Y | Utility |
|---|---|---|---|---|
| $HOCH_2CH_2CO-$ | H | H | $HOCH_2CH_2CO-$ | Crosslinking agent for polymers containing active hydrogen. |
| $CH_3OCH_2CH_2CO-$ | H | H | $CH_3CH_2CH_2CO-$ | Do. |
| $ClCH_2CH_2CO-$ | H | H | $ClCH_2CH_2CO-$ | Do. |
| $C_5H_5NCH_2CH_2CO-$ plus | H | H | $C_5H_5NCH_2CH_2CO-$ plus | Do. |
| $CH_3OCH_2CH_2CO-$ | $CH_3$ | $CH_3$ | $CH_3OCH_2CH_2CO-$ | Crosslinking agent. |
| $CH_3OCH_2CH_2CO-$ | H | H | H | Intermediate. |
| $CH_3OCH_2CH_2CO-$ | H | $CH_3$ | $CH_3$ | Do. |
| $CH_3OCH_2CH_2CO-$ | $-CH_2OH$ | $CH_3$ | $CH_3$ | Unsymmetrical crosslinking agent. |
| $CH_3OCH_2CH_2CO-$ | H | H | $CH_3COOCH_2CH_2CO-$ | Do. |
| $CH_3OCH_2CH_2CO-$ | $CH_3$ | $CH_3$ | $CH_2=CHCO-$ | Do. |
| $CH_2=C-CO-$<br>\|<br>$CH_3$ | $CH_3$ | $CH_3$ | $CH_3$ | Intermediate. |
| $C_2H_5OCH_2CH_2CO-$ | $-CH_2OH$ | $-CH_2OH$ | $C_2H_5OCH_2CH_2CO-$ | Polyfunctional crosslinking agent. |
| $NaO_3SOCH_2CH_2CO-$ | $CH_3$ | $CH_3$ | $NaO_3SOCH_2CH_2CO-$ | |
| $CH_2=CHCO-$ | H | $C_{18}H_{37}$ | $C_{18}H_{37}$ | Water repellent, lubricant. |
| $CH_3OCH_2CH_2CO-$ | H | H | $C_{17}H_{35}CO-$ | |
| $CH_2=CHCO-$ | H | H | $NO_2C_6H_4CO-$ | Intermediate for reactive dyes. |
| $ClCH_2CH_2CO$ | H | H | $H_2NC_6H_4CO-$ | Do. |
| $ClCH_2CH_2CO-$ | $CH_3$ | $CH_3$ | $H_2NC_6H_4CO-$ | Do. |
| $CH_2=CHCO$ | $C_2H_5$ | $C_2H_5$ | $NO_2C_6H_2Cl_2SO_2-$ | Do. |
| $ClCH_2CH_2CO$ | $ClC_6H_4$ | $C_6H_5$ | $ClCH_2CH_2CO-$ | Crosslinking agents and intermediates for reactive dyes. | oyl, $R_5CO-$ where $R_5$ is an alkyl group from 1–17 carbon atoms, substituted phenyl and X.

Further compounds which are included in the scope of Formula I are represented by the following structural formula:

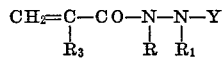

wherein R, $R_1$, $R_3$ and Y have the same meanings given above.

Another group of compounds which are encompassed by the generic Formula I are repesented by the structural formula:

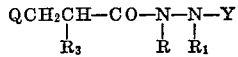

wherein R, $R_1$, $R_3$, Y and Q have the same meaning given above.

The radical Q thus represents a polar residue derived from weakly nucleophilic reagents and includes but is not limited to the following polar residues:

| | |
|---|---|
| Sulfate | $-OSO_3M$ |
| Thiosulfate | $-SSO_3M$ |
| Acetate | $-OCOCH_3$ |
| Formate | $-OCOH$ |
| Propionate | $-OCOC_2H_5$ |
| Pyridinium | $-NC_5H_5$<br>+ |

Benzyldimethyl ammonium

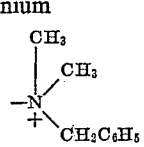

where M is an alkali metal, e.g. Na, K, Li or ammonium.

Still further compounds of the present invention are represented by the structural formula:

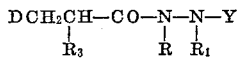

wherein R, $R_1$, $R_3$ and Y have the same meanings as given above and D is halogen, selected from the group consisting of chlorine, bromine and iodine.

Further examples of compounds included in Formula I are:

$CH_3OCH_2CH_2CONHNHCOCH_2CH_2OCH_3$ 1,2-bis(3-methoxypropionyl) hydrazine

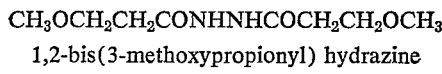

1,1-dimethyl-2-methylol-2-(3-methoxypropionyl) hydrazine

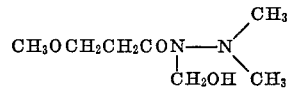

1,1-bis-(2-cyanoethyl)-2-(3-methoxypropionyl) hydrazine $CH_3OCH_2CH_2CONH-NHCOCH_2CH_2Cl$ 1-(3-chloropropionyl)-2-(3-methoxypropionyl-) hydrazine $NO_2C_6H_4CONH-NHCOCH_2CH_2OCH_3$ 1-(3-methoxypropionyl)-2-(4-nitrobenzoyl) hydrazine $(CH_3)_2NC_6H_4CH=N-NHCOCH_2CH_2OCH_3$ 1-(3-methoxypropionyl)-2-(4-dimethylamino benzylidine) hydrazine $NO_2C_6H_4CH=N-NHCOCH_2CH_2OCH_3$ 1-(3-methoxypropionyl)-2-(nitrobenzylidine) hydrazine

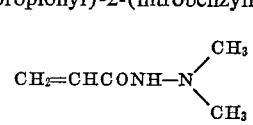

1,1-dimethyl-2-acryloyl hydrazine

Compounds included in Formula II are those wherein A is an alkylene group of 3 to 4 carbon atoms. The alkylene group can have various substituents attached thereto, including but not limited to one or more hydroxy groups. Examples of specific compounds coming within the scope of Formula II are shown in Table II in which X, Y and A are identified.

TABLE II.—COMPOUNDS OF FORMULA II

| X | A | Y |
|---|---|---|
| $CH_3OCH_2CH_2CO-$ | $-(CH_2)_3-$ | $CH_3OCH_2CH_2CO-$ |
| $CH_3OCH_2CH_2CO-$ | $-(CH_2)_4-$ | $CH_3OCH_2CH_2CO-$ |
| $CH_3OCH_2CH_2CO-$ | $-CH_2CH(OH)-CH_2-$ | $CH_3OCH_2CH_2CO-$ |
| $HOCH_2CH_2CO-$ | $-CH(OH)-CH_2-CH(OH)-$ | $HOCH_2CH_2CO-$ |

Compounds of Formulae III and IV contain the group Z which is alkyl, substituted alkyl, aryl and alkylaryl groups. Included are alkyl groups containing from 1 to about 5 carbon atoms, haloalkyl, nitrobenzyl, aminobenzyl, alkylaminobenzyl and halonitrobenzyl. Specific examples of these compounds are shown in Table III below.

TABLE III.—COMPOUNDS OF FORMULAE III AND IV

| X | R | $R_3$ | Z |
|---|---|---|---|
| $CH_3OCH_2CH_2CO-$ | H | H | $C_6H_5N(CH_3)_2$ |
| $CH_3OCH_2CH_2CO-$ | H | H | $C_6H_5NO_2$ |
| $ClCH_2CH_2CO-$ | H | H | $ClC_6H_4NO_2$ |

The compounds of the present invention can be prepared according to the following description of procedures. For example, compounds of Formula I can be prepared by reacting hydrazine with acylating agents such as the corresponding acid halides, esters and anhydrides.

Illustrative of this process and employing a compound wherein X and Y are both $$R_2OCH_2CH(R_3)-CO-$$

Equation 1 shows the acylation of hydrazine with methyl beta-methoxypropionate.

(1) $H_2NNH_2 + 2CH_3OCH_2CH_2COOCH_3 \rightarrow$
$CH_3OCH_2CH_2CONHNHCOCH_2CH_2OCH_3$ The product of Equation 1 can be converted to other useful compounds of Formula I in which $$X=Y=CH_3OCH_2CH_2CO-$$

and R and $R_1$ are alkyl, by alkylation reactions as shown by way of example in Equation 2 for methylation.

(2) $CH_3OCH_2CH_2CONHNHCOCH_2CH_2OCH_3 \xrightarrow{(CH_3)_2SO_4}$
$CH_3OCH_2CH_2CON(CH_3)-N(CH_3)-COCH_2CH_2OCH_3$ By reacting the product of Equation 1 with formaldehyde under suitable conditions, a compound will be obtained corresponding to Formula I in which both X and Y are $CH_3OCH_2CH_2CO-$ and both R and $R_1$ are $CH_2OH$.

The product of Equation 1 can be reacted with an organic dihalide containing 3 to 4 carbon atoms to produce a cyclic derivative such as is shown in Formula II. For example, Equation 3 shows the preparation of a cyclic product from the product of Equation 1 and 1,3 dichloropropanol-2.

(3) $CH_3OCH_2CH_2CONHNHCOCH_2CH_2OCH_3$
$+ ClCH_2CH(OH)CH_2Cl \longrightarrow$

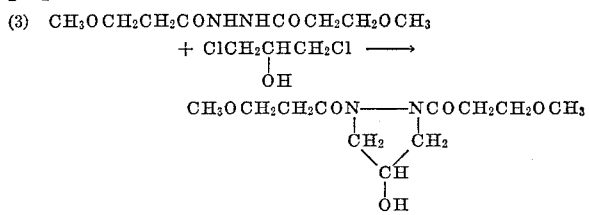

Compounds of Formulae I and II in which X and Y are different are obtained by the following procedures. A monoacylated hydrazine can be prepared as shown in Equation 4, and converted to unsymmetrical hydrazine derivatives in a subsequent step.

(4) $CH_3OCH_2CH_2COOCH_3 + H_2NNH_2 \rightarrow$
$CH_3OCH_2CH_2CONHNH_2$

The product of Equation 4 corresponds to Formula I in which Y, R and $R_1$ are hydrogen. The hydrogen can be acylated as shown in Equation 5.

(5) $CH_3OCH_2CH_2CONHNH_2 + R_4COCl \rightarrow$
$CH_3OCH_2CH_2CONHNH_2COR_4$ in which $R_4$ represents a substituted or unsubstituted alkyl, aryl or aralkyl group. The product of Equation 5 corresponds to Formula I in which both R and $R_1$ are hydrogen and Y is acyl, i.e., $R_4CO-$.

The product of Equation 4 can also be alkylated as shown in Equations 6 and 7 for methylation.

(6) $CH_3OCH_2CH_2CONHNH_2 + (CH_3)_2SO_4 \longrightarrow$

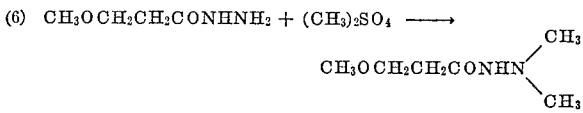

The product of Equation 7 corresponds to Formula I which R is hydrogen and $R_1$ and Y are both $CH_3-$.

7) $CH_3OCH_2CH_2CONHNH_2 + 2CH_2=CHCN \longrightarrow$

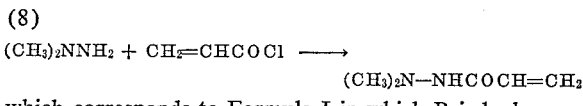

The product of Equation 6 corresponds to Formula I in which R=hydrogen and $R_1=-CH_2CH_2CN$.

In the foregoing equations, saturated compounds where X is $$R_2OCH_2CH(R_3)-CO-$$

have been shown. The procedure for the preparation of the unsaturated compounds wherein X is $$CH_2=C(R_3)-CO-$$

is somewhat more critical, because side reactions can more easily occur. The acylation of unsymmetrical N,N-dimethyl hydrazine with the corresponding acid halide, e.g. acryloyl chloride to yield the unsaturated product shown in Equation 8.

(8)
$(CH_3)_2NNH_2 + CH_2=CHCOCl \longrightarrow$
$(CH_3)_2N-NHCOCH=CH_2$ which corresponds to Formula I in which R is hydrogen, $R_1$ and Y are $CH_3-$ and X is $CH_2=CHCO-$.

Compounds in which X is $$QCH_2CH(R_3)-CO-$$

can generally be prepared either directly or from those in which X is $$R_2OCH_2CH(R_3)CO-$$

or from those in which X is $$CH_2=C(R_3)-CO-$$

For example, the acylation reactions employing beta-chloropropionyl chloride shown in Equations 1, 4, 5, 8, results in the formation of beta-chloropropionyl hydrazines which can be converted to quaternary ammonium derivatives or thiosulfate derivatives. Alternately, the unsaturated hydrazide (e.g. product of Equation 8) can be reacted with amine hydrochloride, sodium thiosulfate and the like to obtain the desired compounds. The compounds represented by Formula I can thus be obtained by several sequences of reactions, some of which have been discussed above and will be more fully illustrated in the examples.

The hydrazone compounds of Formula III can generally be obtained by reacting a monoacylated hydrazine derivative with a corresponding carbonyl compound as shown in Equation 9.

(9)

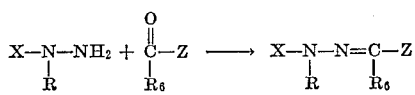

wherein $R_6$ is a member selected from the group consisting of hydrogen and Z.

The following examples will illustrate the invention but are not considered as limiting in any way.

Example I.—3-methoxypropionyl hydrazine

Methyl 3-methoxypropionate (354 g., 3.0 m.) was combined with methanol (75 g.). To the solution, anhydrous hydrazine (96.0 g., 3.0 m.) was added dropwise over 30 min. The reaction temperature rose to 64° during addition. The clear solution which resulted was permitted to cool with stirring for 2 hrs., then to stand for 72 hrs. Methanol was stripped under vacuum and the product distilled: B.P. 109–112° (1.0 mm.), wt. 343 g. (97% yield), $n_D^{23°}$ 1.4810.

Analysis.—Calculated, percent: C, 40.66; H, 8.53; N, 23.71; $OCH_3$, 26.26. Found, percent: C, 41.39; H, 8.83; N, 25.01; $OCH_3$, 23.58.

3-methoxypropionylhydrazine is miscible with water and lower alcohols in all proportions and is moderately soluble in benzene and other hydrocarbon solvents. Its infrared spectrum ($CHCl_3$ solution) shows maxima at 2.90, 2.00 (NH), 6.02 (amide carbonyl), 6.62 (amide II band), and $9.00\mu$ (methoxyl).

Example II.—1,2-bis-(3-methoxypropionyl)hydrazine

Anhydrous hydrazine (133 g., 3.9 m.) was added to methyl 3-methoxy-propionate (1171 g., 9.9 m.) over 45 min. The internal temperature rose to 33° during the first half of the addition. During the second half and for 30 min. afterwards, heat was applied to maintain the internal temperature at 50–60°. The reaction mixture was permitted to cool and stand for 72 hrs.

The mixture was heated for 11 hrs. at 135°, during which time a distillate (320 g.) of methanol and recovered ester was recoved. Finally the rest of the ester was removed in vacuum. The semi-solid residue (635 g.) was dissolved in hot benzene, diluted with hexane and permitted to crystallize.

1,2-bis-(3-methoxypropionyl) hydrazine (204 g., 26% yield) was obtained as white prisms, M.P. 78–83°. A purified sample showed infrared maxima (in $CHCl_3$) at 3.10 (NH), 6.18 (amide carbonyl), 6.65 (shoulder, amide II band), and $9.0\mu$ (methoxyl).

Analysis.—Calculated: C, 47.05%; H, 7.89%; N, 13.72%; $OCH_3$, 30.39%. Found: C, 46.75%; H, 7.99%; N, 12.97%; $OCH_3$, 28.76%.

Example III.—1,2-bis-(3-methoxypropionyl) hydrazine (via acid chloride)

3-methoxypropionyl chloride (179 g., 1.45 m.) and hydroquinone (0.5 g.) were dissolved in benzene (800 ml.). A solution of hydrazine (45 g., 1.32 m.) and triethylamine (266 g., 2.64 m.) in chloroform (600 ml.) was added with stirring during 2 hrs. while maintaining the reaction temperature at −10 to 0°. After addition was complete, the mixture was stirred at 0° for 1 hr., permitted to come to room temperature and left overnight.

Triethylamine hydrochloride (120 g., 74% of that expected) was removed by filtration and the filtrate concentrated to 500 ml. and filtered to give the product (84 g., M.P. 85–91°). The filtrate was evaporated to dryness and triturated with benzene (400 ml.). An additional quantity of product (15 g., M.P. 89–93°) was obtained by filtration. The filtrate was evaporated again and the residue fractionally distilled. The fraction boiling 157–165° at 0.55 mm. (25 g.) increased the total crude yield of 1,2 - bis - (3-methoxypropionyl) hydrazine to 124 g. (83% of theory based on 3-methoxypropionyl chloride). The infrared spectrum of the crude product was identical to that of material prepared via the ester. (See Example II.)

Example IV.—1,2-bis-(3-acetoxypropionyl) hydrazine

A mixture of 3-acetoxypropionyl chloride (63 g., 0.42 m.), potassium bicarbonate (42 g., 0.42 m.) and water (100 ml.) was chilled to 5° and treated with 85% hydrazine (7.9 g., 0.21 m.) during 10 min. at 5–7°. The reaction mixture was stirred at room temperature for 2 hrs., filtered, and extracted thoroughly with chloroform.

The solids obtained from the initial filtration and the chloroform extraction (21.6 g., 39% yield) were combined and recrystallized twice from butanol to prepare an analytical sample, M.P. 160–162.5°.

Analysis.—Calculated, percent: C, 46.1; H, 6.15; N, 10.78. Found, percent: C, 47.13; H, 6.57; N, 11.20.

The infrared spectrum (Nujol—purified mineral oil) showed maxima at 3.15 (NH), 5.80 (acetate carbonyl), and $6.27\mu$ (amide carbonyl).

Example V.—1,1-dimethyl-2-(3-methoxypropionyl)-hydrazine 1,1-dimethyl hydrazine (356 g., 5.93 m.) and methyl 3-methoxy-propionate (1403 g., 11.86 m.) were combined and heated under reflux for 77.5 hrs. Methanol and excess ester were removed in vacuo. The yield of crude product was 740 g. (85% yield).

This crude product was fractionally distilled to give 1,1-dimethyl-2-(3-methoxypropionyl)hydrazine (511 g., 59% yield), B.P. 111–120° at 0.9–2.2 mm., $n_D^{22}$ 1.4569.

A portion of this sample was further purified by treating its aqueous solution with potassium carbonate, then extraction and distillation to give a sample, B.P. 108° at 0.25 mm., $n_D^{25}$ 1.4567.

Analysis.—Calculated, percent: C, 49.3; H, 9.6; N, 19.2; $OCH_3$, 21.2. Found, percent: C, 49.85; H, 10.18; N, 18.3; $OCH_3$, 20.79.

An infrared spectrum (in $CHCl_3$) showed maxima at 3.04 (NH), 6.03 (amide carbonyl), 6.66 (amide II band) and $9.01\mu$ (methoxyl).

Example VI.—1,1-dimethyl-2-methylol-2-(3-methoxypropionyl)hydrazine 1,1-dimethyl-2-(3 - methoxypropionyl)hydrazine (product of Example V) (17.5 g., 0.12 m.), paraformaldehyde (3.96 g., 0.132 m.) and ethyl acetate (50 ml.) were combined and brought to pH 9 by the addition of 10 drops of 25% sodium methylate in methanol. The mixture was warmed slowly to 53° and maintained at 50–55° for one-half hour. Several drops of sodium methylate solution were added as necessary to maintain the pH at 9. The mixture was allowed to stand 12 hrs., and was then filtered and the solvent removed in vacuum. The product was obtained as a light amber liquid (17.2 g., 89% yield). The bound formaldehyde content was measured by the method indicated in Example XXI and found to be 15.4% (calculated 17.0%).

Analysis.—Calculated, percent: C, 47.7; H, 9.1; N, 15.9. Found, percent: C, 49.12; H, 9.58; N, 14.85.

The infrared spectrum ($CHCl_3$) showed maxima at 2.95 (OH), 6.10 (amide carbonyl), 9.02 (methoxyl) and $9.88\mu$ (C-O).

Example VII.—1,1-dimethyl-2-(3-methoxypropionyl)-hydrazine

A mixture of 1,1-dimethyl hydrazine (61 g., 1.0 m.), potassium bicarbonate (100 g., 1.0 m.) and water (300 ml.) was treated at 8–12° with 3-methoxypropionyl chloride (123 g., 1.0 m.) during 0.5 hr. The reaction mixture was stirred an additional hour at 10° and then permitted to stand overnight.

The reaction mixture was extracted with chloroform, the organic extracts combined, dried and evaporated. The residue was distilled to give 1,1-dimethyl-2-(3-methoxypropionyl)hydrazine (39.6 g., 27% yield) whose infrared spectrum is identical to that of the material prepared from methyl 3-methoxypropionate (product of Example V).

Example VIII.—1,1-dimethyl-2-acryloyl hydrazine 1,1-dimethyl hydrazine (114 g., 1.9 m.) and triethylamine (192 g., 1.9 m.) in chloroform (600 ml.) were added dropwise during one hour to a solution of acryloyl chloride (188 g., 2.1 m.) and hydroquinone (1 g.) in benzene (1400 ml.) maintained at 2–4°. The mixture was stirred one hour after the addition was complete, then allowed to stand overnight.

The mixture was filtered, the solvents removed by evaporation and the residue fractionally distilled. The product was collected at 72–80° (0.25–0.5 mm.) and slowly solidified to a crystalline solid, M.P. 74–79° (15.6 g., 7% yield).

A pure sample, M.P. 88–90°, was obtained by two recrystallizations from hexane. Its purity was found to be 95% by the activated vinyl method described in The Chemistry of Acrylonitrile, The American Cyanamid Co., second ed., New York, p. 61.

Analysis.—Calculated, percent: C, 52.60; H, 8.83; N, 24.54. Found, percent: C, 53.22; H, 9.44; N, 22.97.

The infrared spectrum (CHCl$_3$) showed maxima at 3.08 (NH), 6.02 (C=C), 6.17 (amide carbonyl), 6.65 (amide II band), and 10.3$\mu$ (vinyl).

Example IX.—1,1-bis-(2-cyanoethyl)-2-(3-methoxypropionyl)hydrazine 1,1-bis-(2-cyanoethyl)hydrazine (69 g., 0.5 m.) and triethylamine (50.5 g., 0.5 m.) were dissolved in benzene (1500 ml.). The solution was cooled to 5°, and 3-methoxypropionyl chloride (61.5 g., 0.5 m.) was added over an hour period with vigorous stirring. The reaction mixture was maintained at 5–10° during the addition and for one hour thereafter, then permitted to warm to room temperature and stand overnight.

Precipitated triethylamine hydrochloride (61.2 g., 89% of theory) was removed by filtration and the solvent removed from the filtrate in vacuo to constant weight. The crude yield of the product was 115 g. (102% of theory). Attempted distillation of the product was unsuccessful because of decomposition.

Analysis.—Calculated, percent: C, 53.54; H, 7.19; N, 24.98. Found, percent: C, 5.533; H, 7.55; N, 22.92.

The infrared spectrum (CHCl$_3$ solution) showed maxima at 3.02 (NH), 4.44 (CN), 6.05 (amide carbonyl), 6.65 (amide II band), and 9.00$\mu$ (methoxyl).

Example X.—1,1-bis-(2-cyanoethyl)-2-acryloyl hydrazine 1,1-bis-(2-cyanoethyl) hydrazine (69.0 g., 0.5 m.), triethylamine (50.5 g., 0.5 m.), and hydroquinone (0.1 g.) were dissolved in benzene (1500 ml.) and the solution chilled to 5°. Acryloyl chloride (45.0 g., 0.5 m.) was added at 5° during one hour. The supernatant liquid was decanted from the precipitate (wt. 220 g.).

The precipitate was stirred for one hour with acetone (500 ml.) and the mixture filtered. Evaporation of the acetone gave a residue (100 g.) of 1,1-bis-(2-cyanoethyl)-2-acryloyl hydrazine whose purity was 80% as indicated by the activated vinyl method described in The Chemistry of Acrylonitrile, the American Cyanamid Co., second edition, New York, p. 61.

A portion of this material was purified for analysis by recrystallization from chloroform-hexane to give needles, M.P. 130–132°.

Analysis.—Calculated: C, 56.26%; H, 6.29%; N, 29.15%. Found: C, 55.54%; H, 6.28%; N, 27.90%.

The infrared spectrum (CHCl$_3$) of this sample showed maxima at 3.16 (NH), 4.47 (CN), 6.03 (C=C), 6.13 (amide carbonyl) and 6.05$\mu$ (amide II band).

Example XI.—1-(3-methoxypropionyl)-2-octadecanoyl hydrazine

A solution of octadecanoyl chloride (33.3 g., 0.11 m.) in chloroform (50 ml.) was added with vigorous stirring to a mixture of 3-methoxy-propionyl hydrazine (11.8 g., 0.1 m.), potassium carbonate (27.6 g., 0.2 m.) and chloroform (100 ml.). The reaction temperature rose from 25 to 54° during the one-half hour addition. The reaction mixture was heated at reflux 6 hrs., diluted with benzene (1500 ml.), warmed and filtered to remove inorganic salts.

The filtrate was evaporated to dryness and the residue recrystallized twice from benzene to give the product (25.2 g., 65% yield) as a white, waxy powder, M.P. 121–125°.

Analysis.—Calculated: C, 68.5%; H, 11.5%; N, 7.3%; OCH$_3$, 8.05%. Found: C, 67.04%; H, 11.17%; N, 7.42%; OCH$_3$, 7.89%.

The infrared spectrum (KBr) showed maxima at 2.93, 3.10 (NH), 6.25 (amide carbonyl) and 8.95$\mu$ (methoxyl).

Example XII.—1-(3-methoxypropionyl)-2-acryloyl hydrazine 1-(3-methoxypropionyl)-2-(3-chloropropionyl) hydrazine (10 g., 0.048 m.) was suspended in benzene (250 ml.) and heated to reflux. Triethylamine (9.7 g., 0.096 m.) was added dropwise to the hot suspension, and the mixture was heated under reflux for eleven hours.

At the end of the reflux period, the reaction mixture was filtered while hot to remove triethylamine hydrochloride (7.1 g.) and the filtrate permitted to cool slowly. 1-(3-methoxypropionyl)-2-acryloyl hydrazine (5.7 g., 69% yield), M.P. 104–108°, was isolated by filtration.

An analytical sample, M.P. 109–113°, was prepared by recrystallization from benzene/hexane. The purity of this sample was found to be 93% by the activated vinyl method described in The Chemistry of Acrylonitrile, the American Cyanamid Co., second edition, New York, p. 61.

Analysis.—Calculated: C, 48.85%; H, 6.97%; N, 16.28%. Found: C, 49.22%; H, 7.61%; N, 16.15%.

The infrared spectrum (CHCl$_3$) showed maxima at 3.12 (NH), 6.22 (amide carbonyl), 9.01 (methoxyl) and 10.35$\mu$ (vinyl).

Example XIII.—1-(3-chloropropionyl)-2-(3-methoxypropionyl) hydrazine

A mixture of 3-methoxypropionyl hydrazine (139 g., 1.18 m.) and potassium bicarbonate (259 g., 2.59 m.) in water (600 ml.) was cooled to 5° and treated with 3-chloropropionyl chloride (300 g., 2.36 m.) dropwise at 4–7° during one hour. After the addition was complete, the reaction was stirred for one hour at room temperature and the product isolated by filtration. Recrystallization from isopropanol gave 1-(3-chloropropionyl)-2-(3-methoxypropionyl) hydrazine (196 g., 74% yield) as fluffy, colorless needles, M.P. 154–158°.

An analytical sample, M.P. 155–158°, was obtained by two further recrystallizations from isopropanol.

Analysis.—Calculated: C, 40.3%; H, 6.22%; N, 13.4%; Cl, 17.0%. Found: C, 39.92%; H, 6.17%; N, 13.01%; Cl, 18.37%.

The infrared spectrum (Nujol—purified mineral oil) showed maxima at 3.10 (NH), 6.30 (amide carbonyl) and 8.95$\mu$ (methoxyl).

Example XIV.—1-(3-acetoxypropionyl)-2-(3-methoxypropionyl) hydrazine 3-methoxypropionyl hydrazine (11.8 g., 0.1 m.), potassium bicarbonate (22.4 g., 0.22 m.) and water (100 ml.) were mixed thoroughly and cooled to 4°. 3-acetoxypropionyl chloride (30 g., 0.2 m.) was added during 30 min. while maintaining the reaction temperature at 4–6°. The mixture was stirred at room temperature for 2 hrs. after the addition was complete, then extracted thoroughly with chloroform. The dried organic extracts were combined, dried, and the solvent removed in vacuo to give a solid residue (23 g.). This residue was recrystallized from benzene-hexane to give 1-(3-acetoxypropionyl)-2-(3-methoxypropionyl) hydrazine (14.0 g., 60% yield) as colorless rods, M.P. 80–88°.

An analytical sample, M.P. 98–99°, was prepared by two further crystallizations from benzene-hexane.

*Analysis.*—Calculated: C, 46.50%; H, 6.90%; N, 12.05%. Found: C, 46.80%; H, 6.86%; N, 12.14%.

The infrared spectrum (CHCl₃) showed maxima at 3.10 (NH), 5.78 (acetate carbonyl), 6.18 (amide carbonyl) and 9.00μ (methoxyl).

Example XV.—1-(3-methoxypropionyl)-2-(4-nitrobenzoyl) hydrazine 2-methoxypropionyl hydrazine (118 g., 1.0 m.) was dissolved in water (500 ml.) and acetone (800 ml.), cooled to 0–10° and acylated by the dropwise addition of a solution of 4-nitrobenzoyl choloride (204 g., 1.1 m.) in acetone (200 ml.). During the addition, the pH of the reaction mixture was maintained at 6–8 by appropriate additions of 10% aqueous potassium carbonate solution. one and one-tenth equivalents were ultimately consumed.

After the addition was complete, the mixture was stirred 3 hrs. at 0–10° and 2 hrs. at room temperature. The reaction mixture was poured onto ice (1500 g.), stirred and the crude product (142 g., 53% yield) isolated by filtration. One recrystallization from methanol gave pale yellow crystals, M.P. 197–200°. An analytical sample was prepared by a second methanol recrystallization, M.P. 206–207.°

*Analysis.*—Calculated: C, 49.4; H, 4.9; N, 15.7. Found: C, 49.44; H, 4.63; N, 15.77.

The infrared spectrum (KBr) showed maximum at 3.13 (NH), 6.31 (amide carbonyl), 6.67, 7.41 (NO₂) and 8.97μ (methoxyl).

Example XVI.—1,1-dioctadecyl-2-acryloyl hydrazine 3-methoxypropionyl hydrazine (5.0 g., 0.042 m.), 1-bromooctadecane (14.1 g., 0.042 m.) and potassium carbonate (3.0 g., 0.021 m.) were combined in ethylene glycol (55 ml.) and heated under reflux 24 hrs. The reaction mixture was extracted three times with benzene, and the solvent evaporated to give the product (12.3 g., 99% yield).

The product was recrystallized twice from benzene-acetone to give the analytical sample, M.P. 64–65°.

*Analysis.*—Calculated: C, 79.1%; H, 13.2%; N, 4.73%; OCH₃, 0%. Found: C, 78.87%; H, 13.41%; N, 4.40%; OCH₃, 0%.

The infrared spectrum (CHCl₃) showed maxima at 3.10 (NH), 6.02 (double bond) and 6.15μ (amide carbonyl).

Example XVII.—1,2-bis-(3-methoxypropionyl) hydrazine 3-methoxypropionyl hydrazine (63 g., 0.5 m.) and methyl 3-methoxy-propionate (123 g., 1.0 m.) were heated together for 3 hrs. to a reaction temperatures of 156° in a distillation apparatus. During the heating period, methanol (8.8 g.) was collected by distillation.

Excess ester was removed in vacuum and the product fractionally distilled. Two fractions were obtained: recovered 3-methoxypropionyl hydrazine (34 g.), B.P. 93–97° at 0.05 mm. and the product (34 g., 68% yield), B.P. 170–180° at 0.3 mm.

The infrared spectrum of this preparation was identical to that of an authentic sample.

Example XVIII.—1-(3-methoxypropionyl)-2-(4-dimethylamino benzylidene) hydrazine 4-dimethyl amino benzaldehyde (75 g., 0.5 m.) was dissolved in benzene (300 ml.) containing glacial acetic acid (5.0 ml.). 3-methoxy-propionyl hydrazine (59 g., 0.5 m.) was added as a mixture in benzene (150 ml.) during one-half hour. The reaction mixture was permitted to stand 3.0 hrs., then was filtered. The precipitate was recrystallized from benzenehexane, filtered and air-dried to give the product (75 g., 60% yield) as yellow prisms, M.P. 140–145°.

*Analysis.*—Calculated: C, 62.6%; H, 7.62%; N, 16.9%. Found: C, 61.19%; H, 7.93%; N, 17.00%.

The infrared spectrum (CHCl₃ solution) shows maxima at 3.01 (NH), 6.02 (amide carbonyl), 6.24 (aromatic), 6.60 (amide II band), and 9.01 (methoxyl).

Example XIX.—1-(3-methoxypropionyl)-2-(3-nitrobenzylidene) hydrazine 3-nitrobenzaldehyde (70.5 g., 0.5 m.) was dissolved in benzene (300 ml.) containing glacial acetic acid (5.0 ml.) 3-methoxy-propionyl hydrazine (59 g., 0.5 m.) was added as a mixture in benzene (250 ml.) during one-half hour. The reaction mixture was permitted to stand 30 min., then was filtered. The precipitate was recrystallized from ethanol, filtered and air-dried to give the product (97 g., 80% yield) as lemon-yellow needles, M.P. 149–152°.

Two further recrystallizations from ethanol gave an analytical sample, M.P. 153–154°.

*Analysis.*—Calculated: C, 52.6; H, 5.18; N, 16.75. Found: C, 52.53; H, 5.16; N, 16.91.

The infrared spectrum (KBr) shows maxima at 3.15 (NH), 6.02 (amide carbonyl), 6.41, 7.43 (NO₂), 6.60 (amide II band), and 9.00μ (methoxyl).

Example XX.—1,1-dimethyl-2-(3-methoxypropionyl) hydrazine 3-methoxypropionyl hydrazine (177 g., 1.5 m.) was dissolved in a solution of sodium hydroxide (23 g., 0.58 m.) in water (1400 ml.) at 70° C. Dimethyl sulfate (1134 g., 6 m.) was added at 70–90° during 75 min. while the pH of the reaction medium was maintained at 8.0–9.5 by addition of 50% aq. sodium hydroxide as necessary. The cooled reaction mixture was permitted to stand overnight, and was extracted with chloroform.

The dried chloroform extract was evaporated to give the product (13.5 g., 6% yield). Distillation of a portion gave a fraction, B.P. 108–110° at 3 mm., $n_D^{25}$ 1.4524 whose infrared spectrum was virtually identical to that of material prepared from 1,1-dimethyl hydrazine and methyl 3-methoxypropionate.

Example XXI.—3-methoxypropionyl hydrazine-formaldehyde (1:1) polymer

Formaldehyde solution, 37% aqueous, (8.2 g., 0.1 m.) was added over 10 min. to 3-methoxypropionyl hydrazine (11.8 g., 0.1 m.). The reaction temperature rose from 28 to 53°. The reaction was cooled to 45° and made basic by the addition of 10 drops of 0.2 N sodium hydroxide. The clear, colorless reaction mixture was permitted to stand 96 hrs.

Water was removed by vacuum evaporation, and the taffylike residue (11.3 g.) taken up in chloroform (50 ml.) and reprecipitated by the addition of hexane (175 ml.). The purified sample (10.5 g.) showed infrared maxima (CHCl₃) at 2.90 (shoulder, weak, OH), 3.07 (NH), 6.00 (amide carbonyl), 6.58 (amide II band), 7.05 (C–N), and 9.00μ (methoxyl), indicating its structure as I, contaminated by some N-methylol groups.

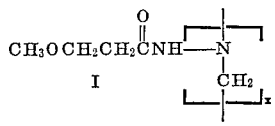

I

*Analysis.*—Calculated: C, 46.1%; H, 7.7%; N, 21.5%. Found: C, 43.48%; H, 7.9%; N, 19.10%.

The formaldehyde content of I was measured by the method described in J. F. Walker, Formaldehyde, second edit., Reinhold Publishing Corp., New York, page 383, and found to increase slowly with time as the C–N backbone undergoes hydrolysis.

Percent formaldehyde.—Calculated: 23.1% (complete hydrolysis). Found: 9.2% (4 hours), 11.2% (20 hrs.).

Example XXII.—3-methoxypropionyl hydrazine-formaldehyde (1:2) polymer

Formaldehyde solution, 37% aqueous, (41 g., 0.5 m.) was added over 20 min. to 3-methoxypropionyl hydrazine (11.8 g., 0.1 m.). The reaction temperature rose from 28 to 43°. The solution was made basic by the addition of 25 drops of 0.2 N sodium hydroxide. The clear, colorless reaction mixture was permitted to stand 96 hrs.

Water was removed by vacuum evaporation, and the taffy-like residue (14 g.) taken up in chloroform (50 ml.) and reprecipitated by the addition of hexane (175 ml.). The purified sample showed infrared maxima (CHCl₃ at 2.9–3.0 (OH), 6.00 (amide carbonyl), 7.10 (C–N), and 9.00μ (methoxyl), indicating its structure as II.

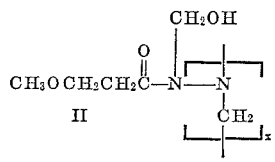

II

*Analysis.*—Calculated: C, 45.0%; H, 7.5%; N, 17.5%. Found: C, 45.01%; H, 7.76%; N, 17.04%; mol. wt. 838. The formaldehyde content of II was measured by the method indicated in Example No. XXI and found also to increase slowly with time as the backbone undergoes hydrolysis.

Percent formaldehyde.—Calculated: 18.75% (no hydrolysis), 37.5% (complete hydrolysis). Found: 23.5% (4 hrs.), 29.2% (20 hrs.).

If the assumption can be made that the rate of backbone hydrolysis of polymers I and II is comparable, then at 20 hrs. polymer II is found to have 29.2−11.2=18.0% amide methylol groups, in close agreement with the calculated value 18.75%.

Example XXIII.—1,2-bis-(3-methoxypropionyl)-1,2-dimethylhydrazine

A solution of 1,2-bis-(3-methoxypropionyl) hydrazine (67.3 g., 0.33 m.) in water (600 ml.) containing sodium hydroxide (10 g.) was heated to 90° C. Dimethyl sulfate (320 g., 2.54 m.) was added to the solution at 90–97° over 1.5 hrs. Sodium hydroxide was added as a 50% aqueous solution as required to maintain the pH of the reaction mixture at 7.5–9.0 (190 ml. used). After the addition was complete, the reaction mixture was maintained at 90° for 10 min., then diluted with water (500 ml.) and the solution extracted repeatedly with chloroform. The organic solvent was dried and evaporated and the residue (61.5 g.) distilled in vacuum. The product (50.9 g., 67% yield) was collected at 122–136° (0.4–0.5 mm.).

The product is soluble in equal weights of water to give neutral solutions. Its infrared spectrum (chloroform solution showed maxima at 6.02 (amide carbonyl), 7.05 (N–CH₃), and 8.95μ (methoxyl) and displayed loss of critical absorptions in the starting material at 3.02 (NH) and 6.65μ (amide II band).

Example XXIV.—1,2-bis-(3-methoxypropionyl)-1,2-bis(hydroxymethyl)hydrazine 1,2-bis-(methoxypropionyl)hydrazine (100 g., 0.49 m.) was dissolved in ethyl acetate (500 ml.), brought to pH 8.5 by the addition of 25% methanolic sodium methoxide, and combined with paraformaldehyde (32.3 g., 1.08 m.). The mixture was heated at 50–60° for 2.5 hrs., cooled, filtered, and the ethyl acetate removed in vacuo to give a light amber syrup. The formaldehyde content was measured by the method of Example XXI and found to indicate 53% conversion.

Re-treatment with paraformaldehyde and base raised the conversion to 87%. This sample was analyzed.
Analysis.—Calculated: C, 45.5; H, 7.57; N, 10.6. Found: C, 45.53; H, 7.51; N, 10.22.

The infrared spectrum (CHCl₃) showed maxima at 2.98 (OH), 6.03 (amide carbonyl), 9.06 (methoxyl) and 9.70μ (C–O).

Note: In the foregoing examples, all temperature notations are in centigrade degrees.

The new and novel compounds of the present invention can be employed for a variety of purposes depending upon the particular structure of the substituent groups. In general, the specific applicability of the compound will depend on the reactivity of the group X which permits the attachment of various substituents to compounds containing active hydrogen by chemical bonds. One particularly important function for the compounds of this invention resides in the modification of polymeric materials as exemplified by Equation 10 in which Pol-H represents a polymeric molecule containing active hydrogen atoms as determined by the Zerewitinov test.

(10)

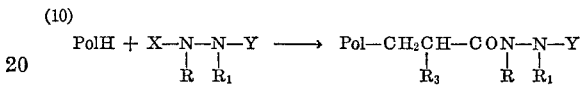

As seen in the above equation, the reactivity of the compound of the present invention depends upon the nature of X and when Y is a reactive group, e.g., another polymeric molecule can be made to react with the hydrazine derivative compound thereby producing a crosslinked polymeric material. This reactivity on the part of the hydrazine derivative compounds of the present invention makes them useful as crosslinking agents particularly for textile materials. In addition, when the R and R₁ substituents in the above Equation 10 are groups capable of reaction with available reactive hydrogen atoms contained in various polymeric materials under suitable conditions, then it is feasible to produce three dimensionally crosslinked materials. An example of a substituent of this type is hydroxy-methyl. By this method of attaching reactive groups directly to the nitrogen atoms it is possible to increase the functionality of the hydrazine compounds of the present invention in order to produce a highly reactive material.

Various other modifications of the novel compounds of this invention can be made. For example, a dye molecule can be attached to the nitrogen atoms in the position of the Y group or the Y group can be converted to or reacted with a dye molecule by a subsequent reaction. Accordingly, when Y is a residue of a dye molecule, Equation 10 represents a novel method of attaching dye to polymers by chemical bonds. Moreover, the hydrazine derivatives wherein Y is the residue of a dye molecule thus represents a novel group of reactive dyes. A further modification resides in converting the R and R₁ substituents on the nitrogen atoms to residue of dye molecules whereupon a reactive hydrazine compound is obtained which is capable of use in treating textiles for obtaining simultaneous crosslinking and dyeing.

When the Y group is a hydrophobic radical such as C₁₈H₃₇ then Equation 10 represents a novel method of attaching hydrophobic substituents to the polymers by chemical bonds. Water repellent textiles can be obtained in this way without the need of applying heavy coating materials which can be washed off in launderings.

The new and novel compounds of the present invention are particularly useful for modification of various materials because of the presence of the hydrazine structure

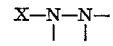

which is stable to hydrolytic conditions.

The substituents and/or crosslinks introduced into a polymer containing active hydrogen atoms in the reaction illustrated by Equation 10 will be resistant to chemical attack. This stability is highly desirable and particularly important when the modified polymer is a textile structure, such as a cellulosic fabric, likely to be subjected to bleaching agents, alkaline detergents, acidic rinses and the like.

The novel compounds of the present invention can be used for a number of purposes as pointed out above and the reactivity of the grouping Z is generally catalyzed by alkali. Consequently, when employed for the chemical modification of polymers, at some point in the reaction the treating composition should be of an alkaline pH so as to enable the reaction to proceed. Because the substituents X and Y can be different, the novel compounds of this invention include unsymmetrical reagents which can be employed for treating materials such as cellulose in two steps wherein the first step takes place under one set of conditions, e.g. alkaline and the second step takes place under different conditions, e.g. acid. This procedure enables close control of the reaction and enables the stepwise crosslinking of cellulosic materials.

As an example of the unsymmetrical reagent and stepwise modification process a compound of the structure:

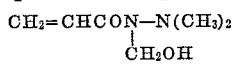

reacts through the N-methylol group under acidic conditions, forming a substituted cellulose represented by the formula:

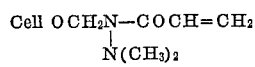

wherein Cell—refers to the cellulose molecule. This can react with another cellulose molecule in a subsequent step catalyzed by alkali or vinyl polymerization catalysts to form crosslinked products:

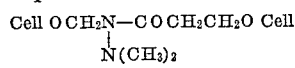

and

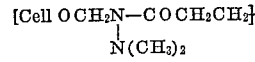

It is understood that various other modifications will be apparent to and can readily be made by those skilled in the art without departing from the scope and spirit of this invention.

What is claimed is:

1. Compounds represented by the structural formula:

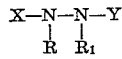

wherein X is a reactive organic functional moiety and is a member selected from the group consisting of

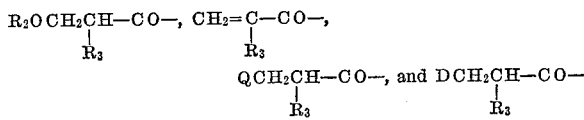

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitrophenyl and halophenyl, and $R_2$ is selected from the group consisting of hydrogen, alkyl from 1 to 5 carbon atoms and $R_4CO-$ where $R_4$ is alkyl from 1 to 5 carbon atoms or phenyl, and $R_3$ is selected from the group consisting of hydrogen and lower alkyl, Q is a member selected from the group consisting of $-OSO_3M$, $-SSO_3M$, $-OCOCH_3$, $-OCOH$, $-OCOC_2H_5$,

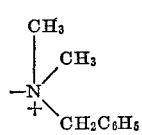

where

M is alkali metal or ammonium,

D is halogen, and

Y is a member selected from the group consisting of cyano-loweralkyl, halo-loweralkyl, $R_5CO-$ where $R_5$ is alkyl from 1 to 17 carbon atoms, $NO_2C_6H_2Cl_2SO_2-$ and X.

2. A compound represented by the structural formula:

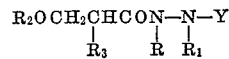

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitrophenyl and halophenyl, and $R_2$ is selected from the group consisting of hydrogen, lower alkyl and $R_4CO-$ groups, wherein $R_4$ is selected from the group consisting of alkyl groups containing from 1 to 5 carbon atoms and phenyl, and $R_3$ is selected from the group consisting of hydrogen and lower alkyl, and Y is a member selected from the group consisting of halo-substituted lower alkyl, cyano-loweralkyl, benzoyl, $NO_2C_6H_4CO-$, $H_2NC_6H_4CO-$, $R_5CO-$ where $R_5$ is an alkyl group containing from 1–17 carbon atoms, and $NO_2C_6H_2Cl_2SO_2$.

3. A compound represented by the structural formula:

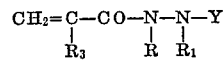

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitrophenyl and halophenyl, and $R_3$ is selected from the group consisting of hydrogen and lower alkyl, and Y is a member selected from the group consisting of halo-substituted lower alkyl, cyano-lower alkyl, benzoyl, $NO_2C_6H_4CO-$, $H_2NC_6H_4CO$, $R_5CO-$ where $R_5$ is an alkyl group consisting from 1–17 carbon atoms, and $NO_2C_6H_2Cl_2SO_2$.

4. A compound represented by the structural formula:

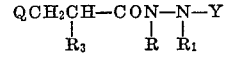

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitrophenyl and halophenyl, and $R_3$ is selected from the group consisting of hydrogen and lower alkyl, Y is a member selected from the group consisting of halo-substituted lower alkyl, cyano-loweralkyl, benzoyl, $NO_2C_6H_4CO-$, $HN_2C_6H_4CO-$, $R_5CO-$ where $R_5$ is an alkyl group containing from 1–17 carbon atoms, and $NO_2C_6H_2Cl_2SO_2$.

Q is the conjugate base of a Lowry-Brønsted acid which has a dissociation constant in water between $5 \times 10^{-2}$ and $5 \times 10^{-5}$ and is selected from the group consisting of $-OSO_3M$, $-SSO_3M$, $-OCOCH_3$, $-OCOH$, $-OCOC_2H_5$, and

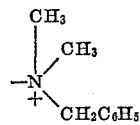

wherein M is a member selected from the group consisting of alkali metal and ammonium.

5. A compound represented by the structural formula:

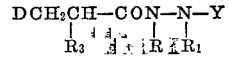

wherein

R and $R_1$ are selected from the group consisting of hydrogen, alkyl from 1 to 18 carbon atoms, cyano-loweralkyl, hydroxy - loweralkyl, halo - loweralkyl, benzyl, phenyl, nitrophenyl and halophenyl, and $R_3$ is selected from the group consisting of hydrogen and lower alkyl, and Y is a member selected from the group consisting of halo-substituted lower alkyl, cyano-loweralkyl, benzoyl, $NO_2C_6H_4CO-$, $H_2NC_6H_4CO-$, $R_5CO-$ where $R_5$ is an alkyl group containing from 1 to 17 carbon atoms, and $NO_2C_6H_2Cl_2SO_2$, and D is halogen.

6. A compound represented by the structural formula:

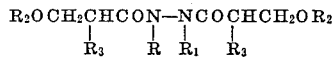

wherein

R and $R_1$ are selected from the group consisting of hydrogen, alkyl from 1 to 18 carbon atoms, cyano-loweralkyl, hydroxy - loweralkyl, halo - loweralkyl, benzyl, phenyl, nitro-phenyl and halogenphenyl, and $R_2$ is selected from the group consisting of hydrogen, lower alkyl and $R_4CO-$ where $R_4$ is a member selected from the group consisting of alkyl groups containing from 1 to 5 carbon atoms and phenyl, and $R_3$ is selected from the group consisting of hydrogen and lower alkyl.

7. A compound represented by the structural formula:

wherein

R and $R_1$ are selected from the group consisting of hydrogen, alkyl from 1 to 18 carbon atoms, cyano-loweralkyl, hydroxy - loweralkyl, halo - loweralkyl, benzyl, phenyl, nitrophenyl and halogenphenyl, and $R_2$ is selected from the group consisting of hydrogen, lower alkyl and $R_4CO-$ where $R_4$ is a member selected from the group consisting of alkyl groups containing from 1 to 5 carbon atoms and phenyl, and $R_3$ is selected from the group consisting of hydrogen and lower alkyl.

8. A compound represented by the structural formula:

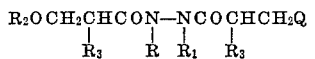

wherein

R and $R_1$ are selected from the group consisting of hydrogen, alkyl from 1 to 18 carbon atoms, cyano-loweralkyl, hydroxy - loweralkyl, halo - loweralkyl, benzyl, phenyl, nitro-phenyl and halogenphenyl, and $R_2$ is selected from the group consisting of hydrogen, lower alkyl and $R_4CO-$ where $R_4$ is a member selected from the group consisting of alkyl groups containing from 1 to 5 carbon atoms and phenyl, and $R_3$ is selected from the group consisting of hydrogen and lower alkyl, and Q is the conjugate base of a Lowry-Brønsted acid which has a dissociation constant in water between $5 \times 10^{-2}$ and $5 \times 10^{-5}$ and is selected from the group consisting of:

$-OSO_3M$, $-SSO_3M$, $-OCOCH_3$, $-OCOH$, $-OCOC_2H_5$ $-\overset{+}{N}C_5H_5$ and

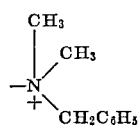

M is selected from the group consisting of alkali metals and ammonium.

9. A compound represented by the structural formula:

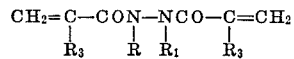

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitro-phenyl and halogenphenyl, and $R_3$ is selected from the group consisting of hydrogen and lower alkyl.

10. A compound represented by the structural formula:

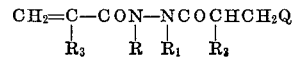

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitro-phenyl and halogenphenyl, and $R_3$ is selected from the group consisting of hydrogen and lower alkyl, and Q is a conjugated base of a Lowry-Brønsted acid which has a dissociation constant in water between $5 \times 10^{-2}$ and $5 \times 10^{-5}$ and is selected from the group consisting of:

$-OSO_3M$, $-SSO_3M$, $-OCOCH_3$, $-OCOH$, $-OCOC_2H_5$

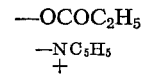

and

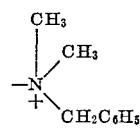

wherein M is selected from the group consisting of alkali metals and ammonium.

11. A compound represented by the structural formula:

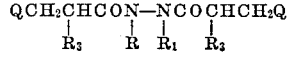

wherein

R and $R_1$ are selected from the group consisting of hydrogen, alkyl from 1 to 18 carbon atoms, cyano-loweralkyl, hydroxy-loweralkyl, halo-loweralkyl, benzyl, phenyl, nitro-phenyl and halogenphenyl, and $R_3$ is selected from the group consisting of hydrogen and lower alkyl, and Q is a conjugated base of a Lowry-Brønsted acid which has a dissociation constant in water between $5 \times 10^{-2}$ and $5 \times 10^{-5}$ and is selected from the group consisting of:

$-OSO_3M$, $-SSO_3M$, $-OCOCH_3$, $-OCOH$, $-OCOC_2H_5$

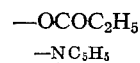

and

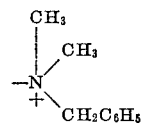

wherein M is a member selected from the group consisting of alkali metal and ammonium.

12. $CH_3OCH_2CH_2CONHNHCOCH_2CH_2OCH_3$ (References on following page)

References Cited

UNITED STATES PATENTS

| | | | |
|---|---|---|---|
| 2,668,154 | 2/1954 | Orth | 260—6 |
| 2,749,331 | 6/1956 | Breslon | 260—89.7 |
| 2,824,878 | 2/1958 | Alberti et al. | 260—307 |
| 2,843,598 | 7/1958 | Donovan | 260—310 |
| 3,025,270 | 3/1962 | De Witt | 260—78 |
| 3,026,332 | 3/1962 | Holland et al. | 260—347.3 |
| 3,031,479 | 4/1962 | Straub et al. | 260—404.5 |
| 3,092,660 | 6/1963 | Gutmann et al. | 260—561 |

OTHER REFERENCES

Sidgwick: Organic Chemistry of Nitrogen (1937), OD 181, N155, page 398.

ALEX MAZEL, Primary Examiner.

J. A. NARCAVAGE, Assistant Examiner.

U.S. Cl. X.R.

117—135.5, 138.5, 139.5; 252—51.5; 260—72, 89.7, 250, 471, 482, 513.6, 518, 534, 556, 558, 559, 562